United States Patent [19]

Wallace

[11] Patent Number: 4,674,729
[45] Date of Patent: Jun. 23, 1987

[54] FRICTION SHOCK-ABSORBING ASSEMBLY AND METHOD OF MAKING

[75] Inventor: William D. Wallace, Indian Head Park, Ill.

[73] Assignee: American Standard Inc., Chicago, Ill.

[21] Appl. No.: 775,974

[22] Filed: Sep. 13, 1985

[51] Int. Cl.⁴ ................................................ F16F 3/02
[52] U.S. Cl. ..................................... 267/9 A; 29/446; 29/464; 29/526 R
[58] Field of Search ............. 267/9 R, 9 B, 9 A, 9 C, 267/10; 213/22, 24, 31, 32 R, 36; 403/362, 378, 379; 29/446, 464, 526 R

[56] References Cited

U.S. PATENT DOCUMENTS

| | | | |
|---|---|---|---|
| 428,215 | 5/1890 | Leverich | 213/31 |
| 1,472,971 | 11/1923 | Geiger | 213/31 |
| 1,853,836 | 4/1932 | Schmidt | 213/32 R X |
| 2,415,188 | 2/1947 | Olander | 267/9 A |
| 2,463,373 | 3/1949 | Gadbois | 267/9 A X |
| 2,624,567 | 1/1953 | Dentler | 267/9 A |

FOREIGN PATENT DOCUMENTS 2420516 3/1975 Fed. Rep. of Germany ........ 213/22

Primary Examiner—Duane A. Reger
Attorney, Agent, or Firm—J. O. Ray

[57] ABSTRACT

A friction shock-absorbing draft gear having an elongated body member secured to a base member which forms a housing of such draft gear. An elongated compressible device disposed within an internal cavity of the body member adjacent the base member. A collar member secured to the body member adjacent an open end thereof. At least one friction shoe, having at least one tapered friction surface, frictionally engaging a correspondingly tapered inner friction surface of the collar member. A wedge member, having a tapered surface, engages a correspondingly tapered surface on the friction shoe and applies an outwardly-directed radial force on the friction shoe to maintain such friction shoe in frictional engagement with the collar member. At least one lug, extending inwardly of the collar member, engages the wedge member to lock the at least one friction shoe and the wedge member in place.

24 Claims, 8 Drawing Figures

4,674,729

FRICTION SHOCK-ABSORBING ASSEMBLY AND METHOD OF MAKING

BACKGROUND OF THE INVENTION

The present invention relates in general to friction shock-absorbing apparatus and, more particularly, the present invention relates to a collar member which provides strength to and friction surfaces for such friction shock-absorbing apparatus and to a method of assembling such friction shock-absorbing apparatus utilizing such collar member.

Although not to be limited thereby, the present invention will be described hereinafter as a railway draft gear assembly, which represents one use for such friction shock-absorbing apparatus.

Prior to the present invention, draft gear assemblies have been used for many years to absorb shock encountered in operating railway vehicles. One example of such draft gear is shown in U.S. Pat. No. 2,463,373, the teaching of which is incorporated herein by reference. This draft gear uses a casting or forged housing open at the front end and closed at its rear end. The casing is of hexagonal transverse cross-section with the walls thereof thickened at its open end. The thickened wall portion provide friction surfaces of V-shaped transverse cross-section. At the open end, the casing is provided with stop lugs at the corners of the casing adjacent the V-shaped surfaces.

A wedge having wedge faces of V-shaped transverse cross-section includes outwardly-projecting radial lugs engaged by the stop lugs.

Three friction shoes having a V-shaped friction surface are interposed between the wedge faces and the casing friction surfaces. The inner end of each shoe has a flat abutment face on which a spring resistance bears. The forward end of each shoe is beveled at opposite sides of its longitudinal center to provide clearance for the wedge block lugs and guide the same in position in back of the cooperating casing lugs.

In assembling the mechanism, the casing is positioned upright and the spring resistance is placed therein. The shoes are then placed on top of the spring. Next, the wedge block is entered between the shoes. The shoes are forced inwardly of the casing against the resistance of the spring until the wedge lugs pass inwardly beyond the casing lugs, thereby freeing the wedge for rotation. Turning of the wedge in a contraclockwise direction engages the wedge lugs in back of the casing lugs, thereby locking the wedge against outward movement.

As can be seen from the above description, such prior art draft gear is rather complex, heavy, and costly to manufacture. These characteristics are typical of prior art type friction draft gear.

SUMMARY OF THE INVENTION

A friction shock-absorbing assembly is disclosed, which includes a collar member disposed at one end thereof. The collar member provides the advantage of using an elongated body member which has an internal cavity with a generally uniform cross-sectional size and shape in a plane transverse to a longitudinal axis of such body member. The collar member is secured to the body member adjacent the open end thereof. The collar member includes an inner friction surface tapered downwardly and inwardly toward the longitudinal axis of the body member. A base member and the body member form a housing, which is closed at one end thereof and open at one end thereof.

An elongated generally compressible energy storage and release means is disposed within the cavity of the body member for respectively storing and releasing energy during a respective compression loading and unloading on the assembly. At least one friction shoe having a portion thereof disposed within the cavity is provided, and includes at least one tapered friction surface engaged with the tapered surface of the collar member.

A wedge member is provided to apply an outward radial force on the at least one friction shoe.

At least one lug member extends inwardly from the inner surface of the collar member and engages the wedge member to secure the wedge member to the assembly adjacent the open end of said body member.

A method of fabricating such a friction shock-absorbing assembly includes forming an elongated body member with an internal cavity having a generally uniform cross-sectional size and shape in a plane transverse to a longitudinal axis of such body member. A collar member is formed having an inner friction surface tapered downwardly and inwardly toward the longitudinal axis of the body member with at least one lug member extending inwardly from the inner friction surface. An elongated compressible means is selected to respectively store and release energy during a loading and unloading of compression on such assembly. The elongated compressible means is inserted into the cavity of the body member with one end thereof positioned adjacent the base member. The collar member is secured to the body member, adjacent the open end thereof, and at least one friction shoe having at least one correspondingly tapered friction surface is positioned into frictional engagement with the tapered inner friction surface of the collar member. An engageable surface carried by the friction shoe is positioned to transmit forces respectively to and from the compressible means. A tapered surface, carried by a wedge member, is engaged with a correspondingly tapered surface on the friction shoe to apply an outwardly-directed radial force on the friction shoe and maintian the tapered friction surface, carried by the friction shoe, in frictional engagement with the inner friction surface on the collar member. Thereafter, the wedge member is locked in place by engaging a surface on the wedge member with a mating surface carried by the inwardly-extending lug member carried by the collar member.

OBJECTS OF THE INVENTION

It is, therefore, one of the objects of the present invention to provide a method of fabricating a friction shock-absorbing assembly.

Another object of the present invention is to provide a friction shock-absorbing assembly that is economical to manufacture when a relatively more expensive casting and/or forging for the housing of such friction shock-absorbing assembly is eliminated.

Yet another object of the present invention is to provide a friction shock-absorbing assembly that is lighter in weight.

Still another object of the present invention is to provide a friction shock-absorbing assembly that is easily and securely assembled.

An additional object of the present invention is to provide a friction shock-absorbing assembly which will accommodate a spring means, thus providing such friction shock-absorbing assembly spring resistance.

In addition to the above-described objects, various other objects and advantages of the present invention will become more apparent to those persons skilled in the art of making and using friction-type shock-absorbing equipment from the following more detailed description of the friction shock-absorbing assembly when such description is taken in conjunction with the attached drawings.

DESCRIPTION OF THE INVENTION

In the several views of the drawings, identical parts have been identified with identical numerals.

Figure 1:
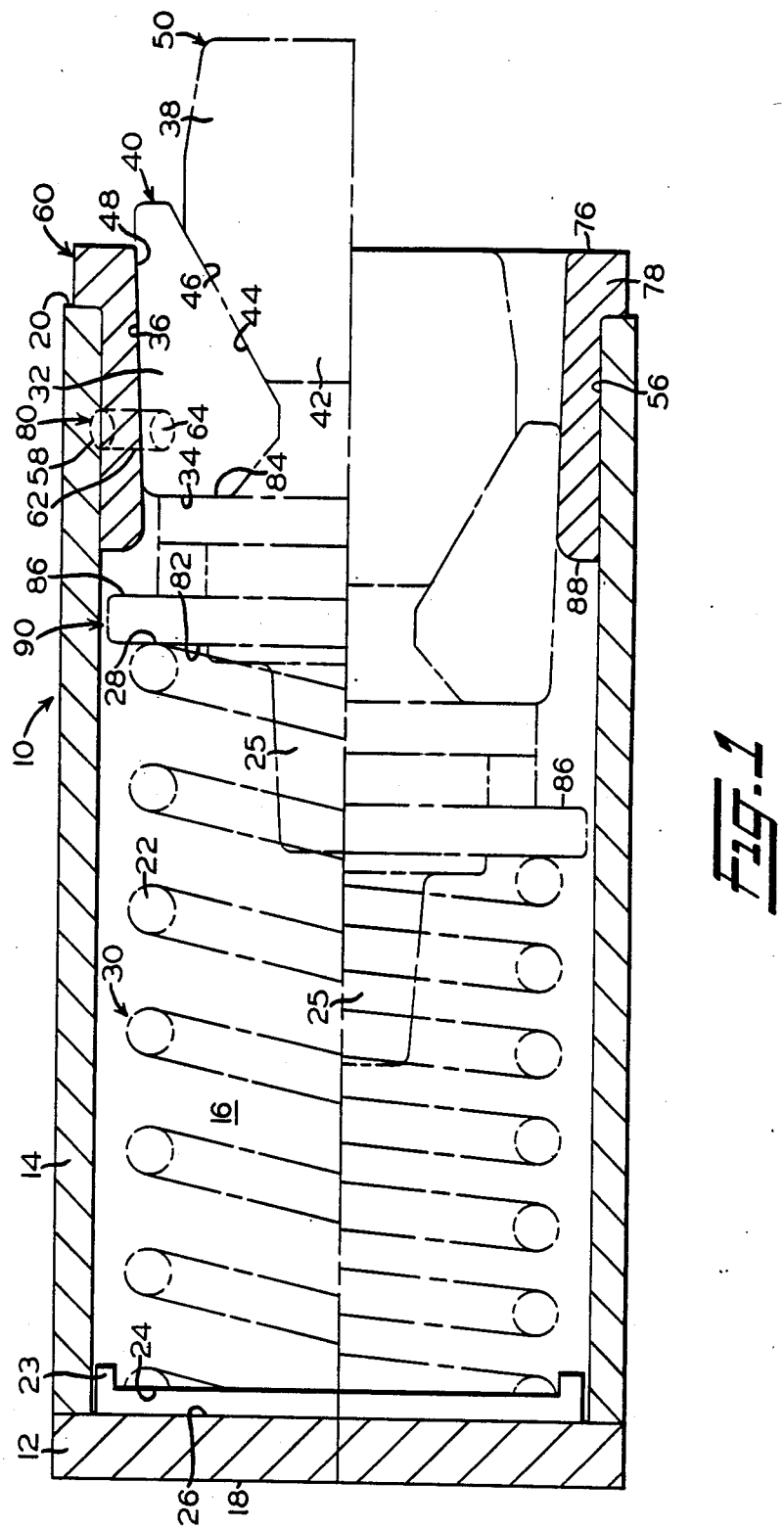
FIG. 1 is a longitudinal cross-sectional view of a presently preferred embodiment of the invention with the draft gear shown in a compressed mode in the lower half of the Figure.
Figure 2:
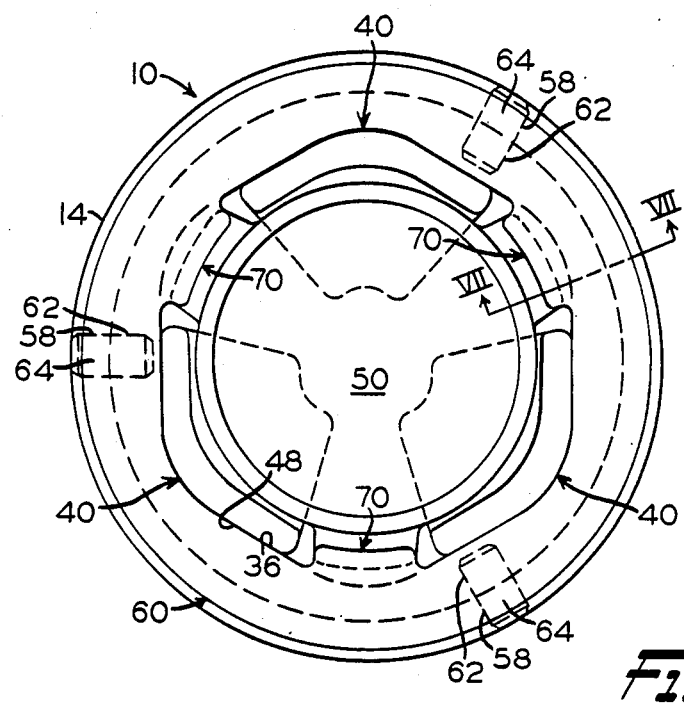
FIG. 2 is an end view of the fabricated friction shock-absorbing assembly shown in FIG. 1.

Now referring to FIGS. 1 and 2, there is illustrated a presently preferred embodiment of the friction shock-absorbing assembly, generally designated 10, which includes a base member 12 disposed at one end thereof. An elongated body member 14 is secured to and extends outwardly from the base member 12. The body member 14 is preferably friction-welded to the base member 12, although other welding techniques may be used in addition to possible other securing means, such as, threading or pins. The body member 14 has an internal cavity 16 with a generally uniform cross-sectional size and shape in a plane transverse to the longitudinal axis of the body member 14. The presently preferred cross-sectional shape of the cavity 16 is generally cylindrical. The preferred cross-sectional size of the cavity 16, adjacent the open end 20 of the body member 14 and in a plane transverse to the longitudinal axis of the body member 14, is at least equal in size to the generally uniform size of the cavity 16 throughout its length. The base member 12 and the body member 14 form a housing for assembly 10, which is closed at one end 18 by the base member 12 and open at the opposite end 20. It should be obvious to persons skilled in the art that base member 12 and body member 14 could be formed as a casting or forging, although such construction would add to the overall cost of the assembly.

An elongated generally compressible energy storage and release means, generally designated 30, is disposed within the cavity 16 of the body member 14. Although not limited thereto, a presently preferred energy storage and release means 30 is at least one compression spring 22. One end 24 of the compression spring 22 is positioned adjacent the inner surface 26 of the base member 12, and the opposite end 28 of the compression spring 22 faces the open end 20 of the body member 14. A spring guide 23 may be used adjacent the end 24 of compression spring 22 and, if desired, a second spring guide 25 may be provided adjacent the opposite end 28 of compression spring 22. The compression spring 22 stores energy during a compression loading on the assembly 10 by resistng such compression and releases the stored energy when the compression loading on the assembly 10 is removed, thereby returning assembly 10 back to its expanded position.

Figure 3:
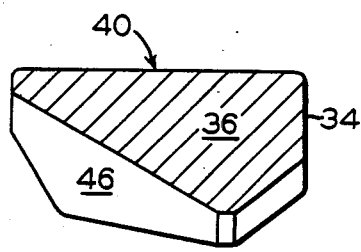
FIG. 3 is a side view, shown in partial cross-section, of a presently preferred friction shoe.

At least one, and preferably three friction shoes, generally designated 40 (FIG. 3), are provided. The friction shoes 40 have at least a substantial portion 32 thereof disposed within the cavity 16 of the body member 14 adjacent the open end 20. The portion 32, disposed within the cavity 16, includes an engageable surface 34 to transmit forces to compress the spring 22. Portion 32 also includes at least one tapered friction surface 36 to frictionally dissipate energy during a compression loading on the draft gear assembly 10. When more than one friction shoe 40 is provided, it is preferred that each friction shoe 40 be of the same size and shape.

Figure 4:
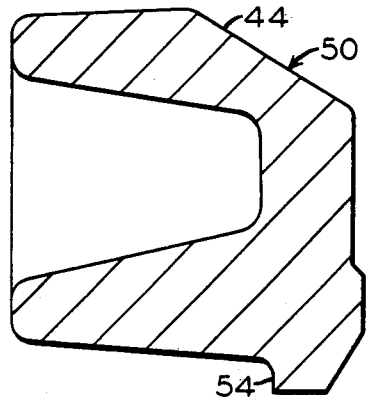
FIG. 4 is a segmented side view, shown in partial cross-section, of a presently preferred wedge member.
Figure 8:
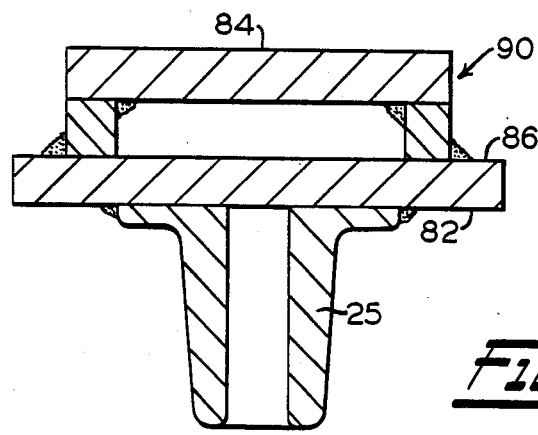
FIG. 8 is a side elevation view, shown in partial cross-section, of a presently preferred seat means.

A wedge member, generally designated 50 (FIG. 4), is positioned such that a first portion 38 is extending externally of the body member 14 when the draft gear 10 is in a released position, as shown in the top portion of FIG. 1. A second portion 42 of the wedge member 50 is disposed within the cavity 16 adjacent the open end 20 of the body member 14. The second portion 42 includes a tapered surface 44 engageable with a correspondingly tapered surface 46 of the friction shoe 40. The wedge member 50 applies an outwardly-directed radial force on the friction shoe 40 to maintain the tapered friction surface 36 in frictional contact with a mating friction surface 48.

Figure 5:
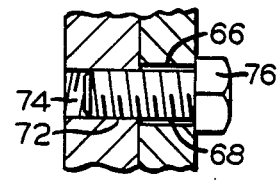
FIG. 5 is a segmented view, in cross-section, showing an alternative means for securing the collar member to the body member.
Figure 6:
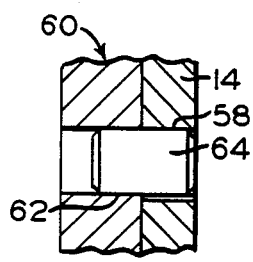
FIG. 6 is a segmented view, in cross-section, showing another alternative means for securing the collar member to the body member.
Figure 7:
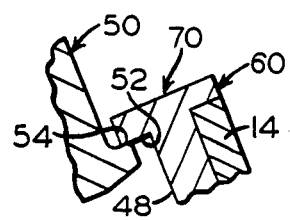
FIG. 7 is a fragmented cross-sectional view, taken along lines VI—VI of FIG. 2, showing the lug engaging means of the collar member with the wedge.

In the practice of the present invention, the mating friction surface 48 is an inner surface of a collar member, generally designated 60. The collar member 60 is secured to the body member 14, adjacent the open end 20. At least one, and preferably three lug members, generally designated 70 (FIGS. 2 and 7), extend inwardly from the inner surface of the collar member 60. When a plurality of lug members (such as 70) are provided, it is the presently preferred practice that such lug members 70 be spaced substantially equidistantly apart about the periphery of the inner surface of the collar member 60. The lug member 70 includes a surface 52, which faces the base member 12 that is engageable with a surface 54 positioned on the wedge member 50 (FIG. 6). The surface 54 faces the open end 20 of body member 14. Engagement of surface 52 with surface 54 secures such wedge member 50 in place to the draft gear 10 adjacent the open end 20 of the body member 14. Although not limited thereto, in the presently preferred practice of the invention, the collar member 60 is positioned within the cavity 16 of the body member 14. In this case, the collar member 60 has an outer surface 56 which is substantially the same size and shape as the cross-sectional size and shape of the cavity 16 in the plane transverse to the longitudinal axis of the body member 14. It is also presently preferred that the collar member 60 be secured to the body member 14 in a removable manner to facilitate: (1) assembly, and (2) disassembly, repair, and reassembly of the draft gear 10. In this case, the fabricated draft gear 10 includes at least one removable securing means, generally designated 80 (FIGS. 1, 5 and 6), engageable with the collar member 60 and the body member 14 to secure such collar member 60 within the cavity 16 of the body member 14. The removable securing means 80 includes at least one aperture 58 through a sidewall of the body member 14, which is in alignment with an at least one aperture 62 through a sidewall of the collar member 60. According to an embodiment of the invention, the removable securing means 80 includes a pin 64 which is frictionally-engaged in the aperture 58 in the sidewall of the body member 14 and the aperture 62 through the sidewall of the collar member 60. In an alternative embodiment (FIG. 5), the aperture 66 includes threads 68 and the aperture 72 includes threads 74, in which case the removable securing means 80 is a bolt 76 threadedly-engaged in apertures 66 and 72. In the presently preferred practice of the invention, the inner surface of the collar member has a hexagonal cross-sectional shape in the plane transverse to the longitudinal axis of the body member 14. The hexagonal tapered inner surface is the mating friction surface 48 and is tapered in the range of between about 0.180 inch and about 0.200 inch in a length of about 6 inches. The tapered mating surface 48 is tapered from the end 76 furthest from the base member 12 downwardly toward such base member 12 and inwardly toward the longitudinal axis of the body member 14. The collar member 60 is formed, according to a presently preferred embodiment of the invention, from a plurality of pieces, preferably three, which are substantially equal in size and shape. In any case, it is preferred that when the collar member 60 includes a plurality of pieces, that a corresponding number of friction shoes 40 be provided. The collar member 60 may also include, according to the presently preferred embodiment, an outer ledge portion 78 which extends outwardly from and in abutting engagement with the open end 20 of the body member 14.

The friction shock-absorbing assembly 10 may also include a seat member, generally designated 90, disposed within the cavity 16 of the body member 14 intermediate the compression spring 22 and the friction shoe 40. The seat member 90 includes a first surface 82 that is abuttingly-engageable with the opposite end 28 of the compression spring 22 and a second oppositely-facing surface 84 abuttingly-engageable with the engageable surface 34 of the friction shoe 40. In this arrangement, the seat member 90 transmits the compressive force to the compression spring 22 from the friction shoe 40 during a compressive loading on the draft gear assembly 10. Conversely, when the compressive loading on the draft gear assembly 10 is removed, the seat member 90 transmits the stored energy being released from the compression spring 22 to the friction shoe 40, thereby returning the draft gear assembly 10 back to an expanded position. The seat member 90 includes a third surface 86, at least a portion of which abuttingly engages the collar member 60 along an inner ledge portion 88, facing the base member 12. Such abutting engagement between the ledge portion 88 and the third surface 86 occurring only when the draft gear assembly 10 is in its expanded position.

A method of fabricating such a friction shock-absorbing assembly 10, shown as a draft gear, involves forming the elongated body member 14 with the internal cavity 16, having a generally uniform cross-sectional size and shape in the plane transverse to the longitudinal axis of such body member 14. The base member 12 is seucred, preferably at present, by friction-welding to the body member 14, thereby forming a housing for the draft gear assembly 10. A compression spring 22 is selected for use. The compression spring 22 stores and releases energy. The selected compression spring 22 is inserted into the cavity 16 of the body member 14 with one end 24 thereof positioned adjacent the base member 12, and the opposite end 28 facing the open end 20 of the body member 14. A collar member 60 is formed with a tapered inner friction surface 48. In the presently preferred practice of the invention, the tapered inner friction surface 48 of the collar member 60 is formed into a hexagonal cross-sectional shape in the plane transverse to the longitudinal axis of the body member 14, and the taper of the tapered inner friction surface 48 is in the range of between about 0.180 inch and about 0.200 inch in a length of about 6 inches. Additionally, the fabrication method, according to a presently preferred practice, includes forming the collar member in a plurality of substantially identical pieces. The collar member 60 is secured to the body member 14, adjacent the open end 20, with the taper of tapered friction surface 48 being downwardly toward the base member 12 and inwardly toward the longitudinal axis of the body member 14.

The friction shoes 40 are positioned such that a correspondingly tapered friction surface 36, carried thereon, engages friction surface 48, and the engageable surface 34 can transmit force to the compression spring 22. The tapered surface 44 of the wedge member 50 is engaged with a correspondingly tapered surface 46 carried by the friction shoe 40. An inwardly-directed force is applied to the wedge member 50, compressing compression spring 22 until the wedge member 50 can be locked in place by engaging a surface 54 on the wedge member 50 with a surface 52 carried by a lug 70 positioned on the collar member 60.

When the collar member 60 is secured to the body member 14 in a removable manner, the fabrication method will include, according to a presently preferred practice of the invention, forming at least one aperture 58 through a sidewall of the body member 14 and at least one aperture 62 through a sidewall of the collar member 60. The apertures 58 and 62 are aligned and a securing means 80 is engaged in such apertures 58 and 62. In an embodiment of the present invention, the fabrication method includes threading at least one of such apertures 66 and 72 in the body member 14 and collar member 60 respectively and engaging a bolt 76 in such threaded apertures 66 and 72, as shown in FIG. 5.

The fabrication method may also include positioning a seat member 90 into the cavity 16 of the body member 14, intermediate the opposite end 28 of compressible means 30 and the engageable surface 34 carried by the friction shoe 40. Further, when compressible means 30 is a compression spring 22, the fabrication method may include placing a guide means, generally designated 100, adjacent at least one end of compression spring 22.

It is desirable that the fabrication method include forming the cross-sectional size of the cavity 16 in the body member 14, adjacent the open end 20, at least equal to the generally uniform size of the cavity 16.

While both the presently preferred and a number of alternative embodiments have been shown and described, the modifications and adaptations may be envisioned by those persons skilled in the art without departing from the spirit and scope of the attached claims.

I claim:

1. A friction shock-absorbing assembly, said friction shock-absorbing assembly comprising:
   (a) a base member disposed at one end of said assembly;
   (b) an elongated body member secured to and extending from said base member, said body member having an internal cavity with a generally uniform cross-sectional size and shape in a plane transverse to a longitudinal axis of said body member, said base member and said body member forming a housing of said assembly which is closed at one end thereof and open at an opposite end thereof;
   (c) an elongated generally compressible energy storage and release means disposed within said cavity of said body member with one end thereof positioned adjacent said base member and an opposite end thereof facing an open end of said body member for respectively storing and releasing energy during a respective compression loading and unloading on said assembly;
   (d) a collar member removably secured to said body member adjacent said open end thereof, said collar member including;
      (i) a hexagonal tapered inner friction surface, said hexagonal tapered inner friction surface being tapered downwardly and inwardly toward said longitudinal axis of said body member in the range of between about 0.180 inch and about 0.200 inch in a length of about six inches,
      (ii) a plurality of lug members extending inwardly from said inner friction surface and spaced substantially equidistant apart, and
      (iii) an outer ledge portion extending outwardly from and in abutting engagement with said open end of said body member;
   (e) at least one removable securing means engageable with said collar member and said body member for removably securing said collar member to said body member;
   (f) at least one friction shoe having at least a substantial portion thereof disposed within said cavity of said body member adjacent said open end, said portion disposed within said cavity including an engageable surface to transmit forces to compress said energy storage and release means and at least one tapered friction surface engageable with said inner friction surface of said collar member to frictionally dissipate energy during a compression loading on said assembly; and
   (g) a wedge member having a portion disposed within said cavity adjacent said open end of said body member, said portion including a tapered surface engageable with a correspondingly tapered surface of said at least one friction shoe, said wedge member applying an outwardly-directed radial force on said at least one friction shoe to maintain said at least one tapered friction surface in frictional engagement with said inner friction surface of said collar member, said wedge member having an outwardly-facing surface engageable with said plurality of lug members to secure said assembly in assembled relationship.

2. A friction shock-absorbing assembly, according to claim 1, wherein said body member is secured to said base member by welding and said body member is generally cylindrical in cross-section in said plane transverse to said longitudinal axis of said body member.

3. A friction shock-absorbing assembly, according to claim 1, wherein said collar member is positioned within said cavity of said body member and further includes an outer surface having substantially a same size and shape as said cross-sectional size and shape of said cavity in said body member in said plane transverse to said longitudinal axis of said body member.

4. A friction shock-absorbing assembly, according to claim 1, wherein said removable securing means includes at least one aperture through a sidewall of said body member and an aligned at least one aperture through a sidewall of said collar member.

5. A friction shock-absorbing assembly, according to claim 4, wherein at least one of said at least one aperture in said sidewall of said body member and said at least one aperture in said sidewall of said collar member are threaded and said removable securing means includes a bolt threadedlyengaged in said at least one of said apertures.

6. A friction shock-absorbing assembly, according to claim 4, wherein said removable securing means includes a pin frictionally-engaged in said at least one aperture in said sidewall of said body member and said at least one aperture in said sidewall of said collar member.

7. A friction shock-absorbing assembly, according to claim 1, wherein said assembly further includes a seat member disposed within said cavity of said body member intermediate said energy storage and releae means and said engageable surface of said at least one friction shoe, said seat member having a first surface abuttingly engageable with said opposite end of said energy storage and release means and a second oppositely-facing surface abuttingly engageable with said engageable surface of said at least one friction shoe, said seat member transmitting a compressive force to said energy storage and release means from said at least one friction shoe during a compressive loading on said assembly.

8. A friction shock-absorbing assembly, according to claim 7, wherein said collar member further includes an inner ledge portion facing said base member, said inner ledge portion abuttingly engageable with at least a portion of a third surface of said seat member when said assembly is in an unloaded expanded position.

9. A friction shock-absorbing assembly, according to claim 1, wherein said energy storage and release means includes at least one compression spring.

10. A friction shock-absorbing assembly, according to claim 9, wherein said assembly further includes at least one spring guide positioned adjacent at least one end of said compression spring.

11. A friction shock-absorbing assembly, according to claim 1, wherein said cross-sectional size of said cavity in said plane transverse to said longitudinal axis of said body member adjacent said open end of said body member is at least equal to said generally uniform size of said cavity in said plane transverse to said longitudinal axis of said body member.

12. A friction shock-absorbing assembly, according to claim 1, wherein said collar member is formed from a plurality of pieces and said assembly further includes a plurality of friction shoes corresponding in number to said plurality of pieces of said collar member.

13. A friction shock-absorbing assembly, according to claim 12, wherein each of said plurality of pieces of said collar member are substantially identical and each of said plurality of friction shoes are substantially identical.

14. A friction shock-absorbing assembly, according to claim 1, wherein said base member and said body member are a single-piece forged casting.

15. A method of assembling a friction shock-absorbing assembly, said method comprising the steps of:
  (a) forming an elongated body member with an internal cavity having a generally uniform cross-sectional size and shape in a plane transverse to a longitudinal axis of said body member;
  (b) securing a base member to said body member formed in step (a) thereby forming a housing of said assembly, said housing being closed at one end by said base member and open at an opposite end thereof;
  (c) selecting an elongated compressible means to store energy during compression of said assembly and to release said energy on unloading said compression of said assembly;
  (d) inserting said compressible means selected in step (c) into said cavity of said body member with one end thereof positoned adjacent said base member and an opposite end thereof facing an open end of said body member;
  (e) forming a collar member having a hexagonal inner friction surface tapered downwardly and inwardly toward said longitudinal axis of said body member in the range of between about 0.180 inch and about 0.200 inch in a length of about six inches and a plurality of lug members extending inwardly from said inner friction surface and spaced substantially equidistant apart;
  (f) removably securing said collar member to said body member adjacent said open end thereof;
  (g) positioning at least one friction shoe having at least one correspondingly tapered friction surface into frictional engagement with said tapered inner friction surface of said collar member to frictionally dissipate energy during compression of said assembly;
  (h) positioning an engageable surface carried by said at least one friction shoe to transmit forces respectively to and from said compressible means during a respective compression loading and unloading of said assembly;
  (i) engaging a tapered surface carried by a wedge member with a correspondingly tapered surface on said at least one friction shoe to apply an outwardly-directed radial force on said at least one friction shoe during compression of said assembly and to maintain said at least one tapered friction surface carried by said at least one friction shoe in frictional engagement with said inner friction surface on said collar member; and
  (j) locking said wedge member in place by engaging a surface on said wedge member with a mating surface carried by each of said plurality of inwardly-extending lug members carried by said collar member.

16. A method of assembling a friction shock-absorbing assembly, according to claim 15, wherein steps (a) and (b) include casting said body member and said base member as a single piece.

17. A method of assembling a friction shock-absorbing assembly, according to claim 15, wherein said method includes the additional step of forging said casting.

18. A method of assembling a friction shock-absorbing assembly, according to claim 15, wherein step (b) includes the step of friction-welding said base member to said body member.

19. A method of assembling a friction shock-absorbing assembly, according to claim 15, wherein to secure said collar member to said body member, said method includes the additional steps of:
  (a) forming at least one aperture through a sidewall of said body member adjacent said open end;
  (b) forming at least one aperture through a sidewall of said collar member;
  (c) aligning said at least one aperture in said body member with said at least one aperture in said collar member; and
  (d) engaging a securing means in said aligned at least one aperture in said body member and said at least one aperture in said collar member.

20. A method of fabricating a friction shock-absorbing assembly, according to claim 19, wherein said securing means is a bolt and said method includes the additional step of threading at least one of said at least one aperture in said body member and said at least one aperture in said collar member.

21. A method of assembling a friction shock-absorbing assembly, according to claim 15, wherein after step (d), said method includes the additional step of inserting a seat member into said cavity intermediate said opposite end of said compressible means and an engageable surface carried by said at least one friction shoe to transmit said forces.

22. A method of assembling a friction shock-absorbing assembly, according to claim 21, wherein said compressible means is at least one compression spring and said method includes the additional step of placing a guide means adjacent at least one end of said compression spring.

23. A method of assembling a friction shock-absorbing assembly, according to claim 15, wherein said method includes the additional step of forming said cross-sectional size of said cavity in said plane transverse to said longitudinal axis of said body member and adjacent said open end of said body member at least equal to said generally uniform size of said cavity in said plane transverse to said longitudinal axis of said body member.

24. A method of assembling a friction shock-absorbing assembly, according to claim 15, wherein said method includes the additional step of forming said collar member in a plurality of substantially identical pieces and providing a plurality of substantially identical friction shoes corresponding in number to said plurality of pieces of said collar member.

* * * * *

UNITED STATES PATENT AND TRADEMARK OFFICE
CERTIFICATE OF CORRECTION

PATENT NO. : 4,674,729
DATED : June 23, 1987
INVENTOR(S) : William D. Wallace

It is certified that error appears in the above-identified patent and that said Letters Patent are hereby corrected as shown below:

Column 8, line 18, delete "threadedlyengaged" and insert

--threadedly-engaged--

Column 10, line 4, delete "15" and insert --16--

Signed and Sealed this

Fifth Day of April, 1988

Attest:

DONALD J. QUIGG

Attesting Officer

Commissioner of Patents and Trademarks